United States Patent
Li (10) Patent No.: US 10,939,358 B2
(45) Date of Patent: Mar. 2, 2021

(54) METHOD AND APPARATUS FOR BUSINESS MIGRATION

(71) Applicant: DATANG MOBILE COMMUNICATIONS EQUIPMENT CO., LTD, Beijing (CN)

(72) Inventor: Haimin Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/968,605

(22) PCT Filed: Jan. 31, 2019

(86) PCT No.: PCT/CN2019/074240
§ 371 (c)(1),
(2) Date: Aug. 10, 2020

(87) PCT Pub. No.: WO2019/154283
PCT Pub. Date: Aug. 15, 2019

(65) Prior Publication Data
US 2020/0413322 A1 Dec. 31, 2020

(30) Foreign Application Priority Data
Feb. 11, 2018 (CN) .......................... 2018 1 0142709

(51) Int. Cl.
*H04Q 11/00* (2006.01)
*H04W 40/36* (2009.01)
*H04W 40/20* (2009.01)

(52) U.S. Cl.
CPC ........... *H04W 40/36* (2013.01); *H04W 40/20* (2013.01)

(58) Field of Classification Search
USPC ............... 370/331; 455/436–442, 456.1–457
See application file for complete search history.

(56) References Cited

U.S. PATENT DOCUMENTS

2004/0165600 A1* 8/2004 Lee .................. H04L 12/462
370/395.53
2017/0288972 A1 10/2017 Li et al.

FOREIGN PATENT DOCUMENTS

| CN | 101867987 A | 10/2010 |
| CN | 104170416 A | 11/2014 |

(Continued)

OTHER PUBLICATIONS

Huawei et al., "Interim Agreements for KI 6", 3GPP TSG SA WG2 Meeting #117, Oct. 17-21, 2016, Kaohsiung city, Taiwan, total 3 pages, S2-166094.

(Continued)

*Primary Examiner* — Suhail Khan
(74) *Attorney, Agent, or Firm* — Kilpatrick Townsend & Stockton, LLP (57) ABSTRACT

A method for data migration includes: receiving by a SMF current location information of a terminal; the SMF is at a core data management center, a first service and a service message are added in the SMF; determining whether it is necessary to switch a path of a business service currently in use for the terminal on the basis of the current location information and original location information of the terminal; and when the determination result is yes, migrating path information of the business service from an original business application to a target business application, the original business application corresponds to the original location information, the target business application corresponds to the current location information; the original business application and the target business application are for providing the business service to the terminal, and have subscribed to the first service.

18 Claims, 6 Drawing Sheets

(56) References Cited

FOREIGN PATENT DOCUMENTS

| CN | 107018542 A | 8/2017 |
|---|---|---|
| CN | 107027153 A | 8/2017 |
| CN | 107404736 A | 11/2017 |
| CN | 107623910 A | 1/2018 |
| CN | 108738086 A | 11/2018 |
| WO | 2017167247 A1 | 10/2017 |

OTHER PUBLICATIONS

Huawei et al.,"Functionalities of UPF and SMF", 3GPP TSG SA WG2 Meeting #118bis, Jan. 16-20, 2017, Spokane, US, total 2 pages, S2-170208.

Samsung,"TS 23.502: Xn based inter NG RAN handover procedures", SA WG2 Meeting #119, Feb. 13-17, 2017, Dubrovnik, Croatia, total 3 pages, S2-171028.

* cited by examiner

METHOD AND APPARATUS FOR BUSINESS MIGRATION

This application is a National Stage of International Application No. PCT/CN2019/074240, filed Jan. 31, 2019, which claims priority to Chinese Patent Application No. 201810142709.3, filed in the China National Intellectual Property Administration on Feb. 11, 2018 and entitled "Method and Apparatus for Business Migration", both of which are hereby incorporated by reference in their entireties.

FIELD

The present application relates to the field of communications, and particularly relates to a method and apparatus for business migration.

BACKGROUND

With the continuous development of mobile communication technology, people bear new technological problems brought about by technological progresses while enjoying the technological progresses.

In mobile communication networks adopting service-oriented architecture, such as in a 5G core network (5GC), due to the adoption of virtual deployment of service architecture and business applications, this type of mobile communication networks can support three major application scenes defined by the international telecommunication union (ITU): enhanced-mobile-broadband, big-connection and low-latency high-reliability scenes. In order to support the low-latency scene, related low-latency services need to be deployed at the edge of the network to eliminate the delay caused by transmission. In addition, high-traffic businesses, such as virtual reality (VR) and augmented reality (AR), also tend to be deployed at the edge of the network.

In the 5G network, a data center is used as an infrastructure. After network element functions and business applications are virtualized, they are deployed in an edge data center, an aggregation data center, and a core data center. This makes it possible for the terminal to move from a region covered by a base station of one data center to a region covered by a base station of another data center during the movement. In the moving process, the terminal may be using a certain business application. In order not to reduce the use experience of users using the terminal due to switching of the data centers, the 5GC is required to smoothly migrate the business application being used by the terminal from the current data center to a target data center.

In the prior art, in order to smoothly migrate the business application being used by the terminal from the current data center to the target data center, a common method may be to deploy a same business application in the two data centers, and directly use services provided by the business application of the target data center after the terminal moves to the target data center.

However, in the process of using this method, when the terminal moves to the target data center, the context of the terminal in the business application of the current data center needs to be restored in the business application of the target data center. This requires establishment of a communication link between the business application of the current data center and the business application of the target data center. In the 5G network, as the number of edge data centers and the types of business applications increase, the number of communication links that need to be established also increases exponentially. This will result in that the deployment of the business applications in the edge data centers not only increases the complexity of deploying the business applications, but also exponentially increases the workload of configuring the communication links of the business applications in the migration process of the business applications.

Therefore, how to effectively reduce the complexity of the deployment of the business applications and the workload of configuring the communication links of the business applications while ensuring the business continuity and business migration has become a problem urgently needing to be solved.

SUMMARY

The present application provides a method and apparatus for business migration, to solve the problems of high deployment complexity of business applications and high workload of configuring communication links of the business applications due to the objectives of realizing business migration and ensuring the business continuity in the prior art.

On a first aspect, in order to solve the above problem, the solution of a method for business migration, provided by embodiments of the present application, is as follows:

receiving, by a Session Management Function (SMF), current location information of a terminal, and the SMF is located at a core data management center, a first service and a service message are added in the SMF, the first service is configured to manage a business application for context, and the service message is configured to configure a communication link of the business application using the first service;

determining, by the SMF, whether it is necessary to switch a path of a business service currently in use for the terminal on the basis of the current location information and original location information of the terminal; and when it is determined that it is necessary to switch the path of the business service currently in use for the terminal, migrating, by the SMF, path information of the business service from an original business application of an original edge data center to a target business application of a target edge data center, and the original business application corresponds to the original location information, and the target business application corresponds to the current location information; and the original business application and the target business application are both for providing the business service to the terminal, and both have subscribed to the first service.

In one embodiment, said determining whether it is necessary to switch the path of the business service currently in use for the terminal includes:

determining whether the current location information is the same as the original location information; and determining, by the SMF, that the path of the business service currently in use needs to be switched for the terminal when the current location information is different from the original location information.

In one embodiment, said migrating, by the SMF, the path information of the business service from the original business application of the original edge data center to the target business application of the target edge data center includes:

transmitting, by the SMF, a context storage notification to the original business application through a first subservice message, and receiving a context, which is returned by the original business application based on the context storage notification, of the business service, and the first subservice message is a message, configured to inform a business application to store a context of a specified business service, in the service message; and restoring, by the SMF, the context of the business service to the target business application through a context restoration subservice to migrate the path information of the business service from the original business application to the target business application, and the context restoration subservice is a subservice in the first service, and is configured to restore a context of a specified business service to a business application; and the context restoration subservice restores the context to the business application through a third subservice message, and the third subservice message is a message, configured to inform the business application to restore the context of the specified business service, in the service message.

In one embodiment, said transmitting, by the SMF, the context storage notification to the original business application through the first subservice message includes:

generating, by the SMF, the context storage notification through a context storage subservice, and the context storage subservice is a subservice in the first service, and is configured to enable a business application to store a context of a specified business application and return the context to the SMF; and transmitting, by the SMF, the context storage notification to an original User Plane Function (UPF) UPF through the first subservice message to enable the original UPF to transmit the context storage notification to the original business application.

In one embodiment, said receiving the context, which is returned by the original business application based on the context storage notification, of the business service includes:

acquiring, by the SMF, the context of the business service from an original UPF of the original business application through a context request subservice, and the context request subservice is a subservice in the first service, and is configured to provide a service to a business application for returning a context; and the context request subservice returns the context to the SMF through a second subservice message, and the second subservice message is a message, configured to inform the SMF to receive a context of a specified business service, in the service message.

In one embodiment, before said migrating, by the SMF, the path information of the business service from the original business application of the original edge data center to the target business application of the target edge data center, the method further includes:

registering, by the SMF, the first service in an original UPF and a target UPF; and accepting, by the SMF, subscription of the original business application to the first service through the original UPF, and accepting, by the SMF, subscription of the target application to the first service through the target UPF.

On a second aspect, embodiments of the present application provide an apparatus for business migration. The apparatus is applied to a session management function (SMF), and includes:

a receiving device, configured to receive current location information of a terminal, and the SMF is located at a core data management center, a first service and a service message are added in the SMF, the first service is configured to manage a business application for context, and the service message is configured to configure a communication link of the business application using the first service;

a determination device, configured to determine whether it is necessary to switch a path of a business service currently in use for the terminal on the basis of the current location information and original location information of the terminal; and a migration device, configured to migrate path information of the business service from an original business application of an original edge data center to a target business application of a target edge data center when it is determined that it is necessary to switch the path of the business service currently in use for the terminal, and the original business application corresponds to the original location information, and the target business application corresponds to the current location information; and the original business application and the target business application are both for providing the business service to the terminal, and both have subscribed to the first service.

In one embodiment, the determination device configured to determine whether it is necessary to switch the path of the business service currently in use for the terminal is configured to:

determine whether the current location information is same as the original location information; and determine that the path of the business service currently in use needs to be switched for the terminal when the current location information is different from the original location information.

In one embodiment, the migration device configured to migrate the path information of the business service from the original business application of the original edge data center to the target business application of the target edge data center is configured to:

transmit a context storage notification to the original business application through a first subservice message, and receive a context, which is returned by the original business application based on the context storage notification, of the business service, and the first subservice message is a message, configured to inform a business application to store a context of a specified business service, in the service message; and restore the context of the business service to the target business application through a context restoration subservice to migrate the path information of the business service from the original business application to the target business application, and the context restoration subservice is a subservice in the first service, and is configured to restore a context of a specified business service to a business application; and the context restoration subservice restores the context to the business application through a third subservice message, and the third subservice message is a message, configured to inform the business application to restore the context of the specified business service, in the service message.

In one embodiment, the migration device configured to transmit the context storage notification to the original business application through the first subservice message is configured to:

generate the context storage notification through a context storage subservice, and the context storage subservice is a subservice in the first service, and is configured to enable a business application to store a context of a specified business application and return the context to the SMF; and transmit the context storage notification to an original User Plane Function (UPF) through the first subservice message to enable the original UPF to transmit the context storage notification to the original business application.

In one embodiment, the migration device configured to receive the context, which is returned by the original business application based on the context storage notification, of the business service is configured to:

acquire the context of the business service from an original UPF of the original business application through a context request subservice, and the context request subservice is a subservice in the first service, and is configured to provide a service to the business application for returning a context; and the context request subservice returns the context to the SMF through a second subservice message, and the second subservice message is a message, configured to inform the SMF to receive a context of a specified business service, in the service message.

In one embodiment, before migrating the path information of the business service from the original business application of the original edge data center to the target business application of the target edge data center, the migration device is further configured to:

register the first service in an original UPF and a target UPF; and accept subscription of the original business application to the first service through the original UPF, and accept subscription of the target application to the first service through the target UPF.

On a third aspect, embodiments of the present application provide an SMF, including at least one memory and at least one processor. The memory stores a computer program executed by the processor to implement the method according to the above first aspect.

On a fourth aspect, embodiments of the present application provide a non-volatile computer readable storage medium storing a computer program. The computer program is executed by a processor to implement the method according to the above first aspect.

In some embodiments provided by the present application, the first service and the service message are added in the SMF to enable the first service of the SMF to be subscribed by the business application, so that the SMF can migrate the business service being used by the terminal from the original business application of the original edge data center to the target business application of the target edge data center in the moving process of the terminal, restoring an operating state of the business service on the target business application side, and then the SMF can switch a business path according to a standard 3rd generation partnership project (3GPP) protocol process. After the business service is accessed into the target business application, since the context of the business service is restored in the target business application, the continuity of use of the business service by the terminal can be guaranteed.

Further, by the use of the above embodiments, the path of the business service is changed under the control of the SMF, the SMF transmits the context storage notification to the business application before the path of the business service is changed, and then the original business application is enabled to transmit the context of the business service to the target business application corresponding to the target UPF of the target data center through the context request subservice, avoiding a demand for direct communication between the original business application and the target business application and a demand for deploying a shared database. Instead, the original business application and the target business application can easily and conveniently complete the migration of the business service of the terminal by subscribing to the first service.

Further, in a 5G network, the UPF can be deployed flexibly. For example, it may be deployed in a core data center, an aggregation data center, an edge data center or a wireless access cloud. The current 3GPP network architecture does not support the business application that is deployed in the same infrastructure as the UPF to subscribe to services published by network functions of the core network, so that through the adoption of the embodiments provided by the present application, service management related interfaces (i.e., service management messages) are added between the SMF and the UPF, and a service management function is added to the UPF; and thus, the 5G core network and other network elements can take the UPF as a proxy and then publish network services (i.e., the first service) through the UPF to enable the business application deployed in the edge data center to subscribe to the services published by network functions of the core network.

DETAILED DESCRIPTION OF THE EMBODIMENTS

The embodiments of the present application provide a method and apparatus for business migration, to solve the problems of high deployment complexity of business applications and high workload of configuring communication links of the business applications due to the objectives of realizing business migration and ensuring the business continuity in the prior art.

Figure 1:
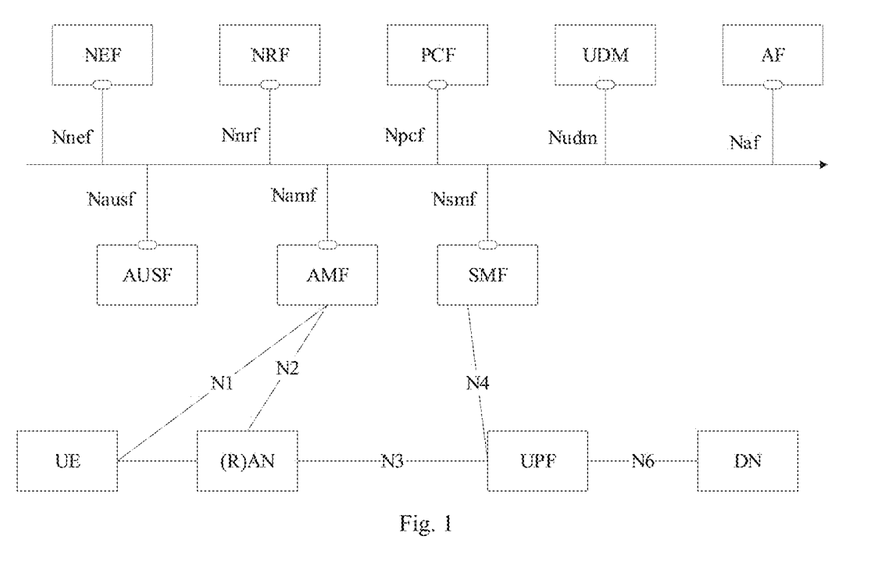
FIG. 1 is a diagram of service architecture of a 5G network.

Referring to FIG. 1, service architecture used by a 5G network is illustrated.

In the service architecture of FIG. 1, the 5G core network is split into a plurality of network element functions, including main network element functions such as an access and mobility management function (AMF), a session management function (SMF) and a user plane function (UPF). The AMF is responsible for access and mobility management, and includes main functions: NAS encryption and integrity protection, registration management, connection management, reachability management, mobility management, transmission of session management messages, access authentication, etc. The SMF is mainly responsible for session management, and includes main functions: session management, session establishment, modification and release, such as tunnel maintenance between a UPF and an access network (AN) node, user equipment (UE) IP address allocation and management, selection and control of UPFs, configuration of UPF flow redirection and routing of flow to a correct destination, etc. The UPF is responsible for user message forwarding, and includes main functions: routing and forwarding of data messages, quality of service (QoS)

processing of the data messages, data message detection and QoS policy execution, flow statistics and reporting, etc.

Figure 2A:
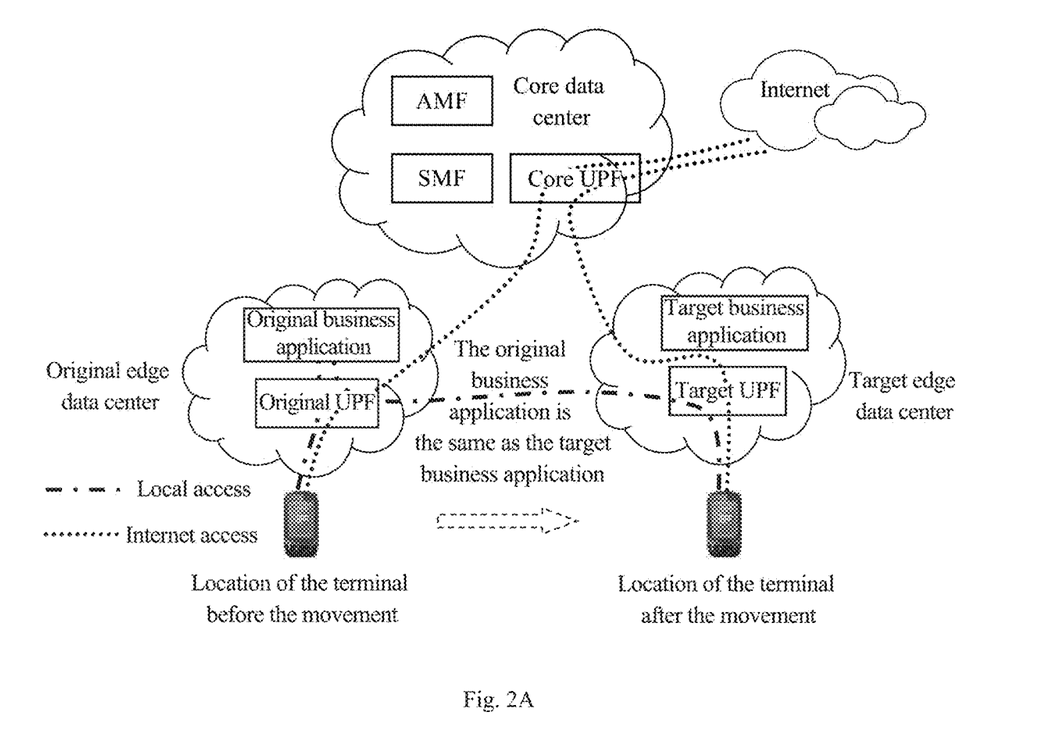
FIG. 2A is a diagram of a migration solution of migrating a terminal from an original data center to a target data center.

Since the 5G network is deployed with a data center serving as an infrastructure, both network functions and business applications may be deployed in one data center. When a terminal moves within a range covered by one data center, a business path and a business application usually do not need to be switched. When the terminal moves from a region covered by one data center to a region covered by another data center, the network may maintain the business continuity by inserting a UPF, as shown in FIG. 2A.

After the terminal moves from a region covered by an original edge data center to a region covered by a target edge data center, a target UPF located at the target edge data center would be inserted into a business path in order to maintain the continuity of a business service used by the terminal, so that the business application used by the terminal is kept unchanged.

However, this mode increases the route of business transmission, and also increases the business flow between the original edge data center and the target edge data center. To solve this problem, the business of the terminal needs to be switched from the original edge data center to the target edge data center. In the 5G core network, since the business service used by the terminal often has a context related thereto, even the same application is used to provide the same business service to the terminal, the business applications need to interact with each other in the process of switching the business applications, so that a target business application acquires a context of the terminal in an original business application.

Figure 2B:
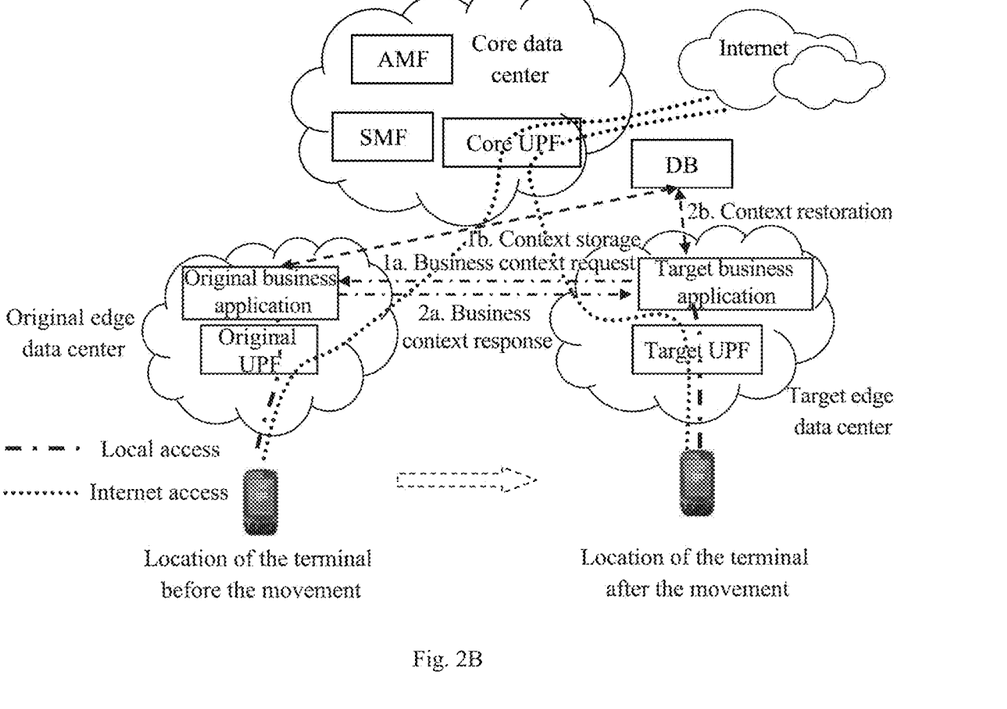
FIG. 2B is a solution diagram of acquiring a context of a business service when the terminal is migrated from the original data center to the target data center.

Referring to FIG. 2B, after the terminal moves to the region covered by the target edge data center, the SMF selects the target UPF located at the target edge data center for a session of the terminal, releases an original UPF in the original edge data center, and configures a flow distribution rule of the target UPF to distribute the business service flow accessing the original business application to the target business application. The business applications may have the business service related contexts, so that after the business service of the terminal is migrated from the original business application to the target business application, the context of the business service needs to be migrated from the original business application to the target business application, and there are two common solutions as follows.

Solution I: the target business application directly communicates with the original business application to transmit a context request, and the original business application transmits the context to the target business application in a response message, as shown in 1a/2a in FIG. 2B.

Solution II: the original business application and the target business application share an external memory; the original business application stores a running context in a common database, and the target business application acquires the context of a user from the database to restore an operating state of the business, as shown in 1b/2b in FIG. 2B.

However, in the above solutions, a communication link needs to be established between the business applications in the solution I, and the number of the communication links increases as the number of the edge data centers increases. Furthermore, if the business applications are deployed in the edge data centers, link information of the same business applications at a plurality of data centers also needs to be modified, so that the deployment and configuration of the business applications are complicated. In the solution II, the shared database that may be accessed by a plurality of edge data centers needs to be deployed, and the business applications need to store the contexts into the shared database, which has limitations to implementation of the business application, so that this solution is not applicable to all the business applications.

In view of this, the general thought of the embodiments of the present application for solving the above problems is as follows.

A method for business migration is provided, including that: an SMF receives current location information of a terminal, the SMF is located at a core data management center, a first service and a service message are added in the SMF, the first service is configured to manage a business application for context, and the service message is configured to configure a communication link of the business application using the first service; the SMF determines whether it is necessary to switch a path of a business service currently in use for the terminal on the basis of the current location information and original location information of the terminal, and obtains a determination result; and the SMF migrates path information of the business service from an original business application of an original edge data center to a target business application of a target edge data center when the determination result is yes, the original business application corresponds to the original location information, and the target business application corresponds to the current location information; and the original business application and the target business application are both for providing the business service to the terminal, and both have subscribed to the first service.

In the above solutions, the first service and the service management message (i.e., the service message) are added in the SMF to enable the first service in the SMF to be subscribed by the business application, so that the SMF can migrate the business service being used by the terminal from the original business application of the original edge data center to the target business application of the target edge data center in the moving process of the terminal, restoring an operating state of the business service on the target business application side, and then the SMF can switch a business path according to a standard 3rd generation partnership project (3GPP) protocol process. After the business service is accessed into the target business application, since the context of the business service is restored in the target business application, the continuity of use of the business service by the terminal can be guaranteed.

In order to better understand the above embodiments, embodiments of the present application will be described in detail below through the drawings and specific embodiments. It should be understood that the embodiments of the present application and specific features in the embodiments are detailed descriptions of the solutions of the present application, and are not intended to limit the solutions of the present application. The embodiments of the present application and the features in the embodiments can be combined with each other without conflicts.

Figure 3:
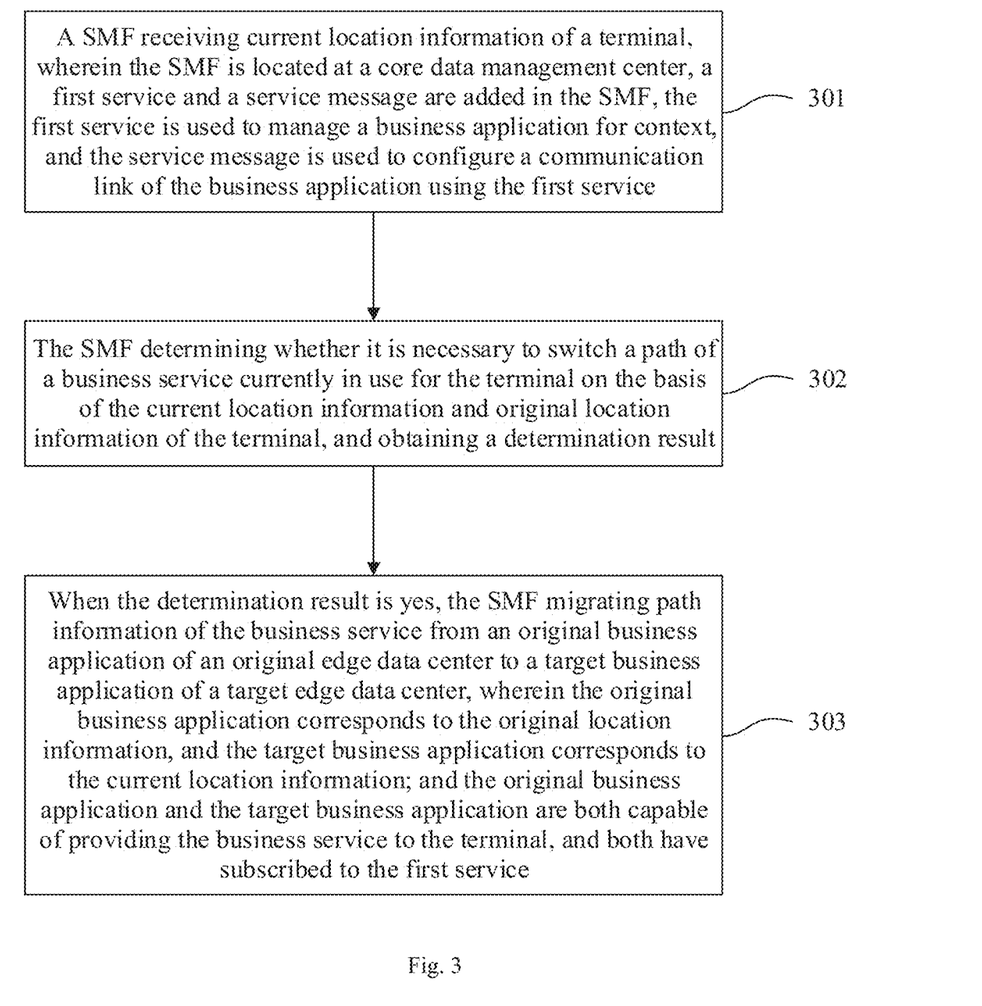
FIG. 3 is a flowchart of business migration provided by an embodiment of the present application.

Referring to FIG. 3, embodiments of the present application provides a method for business migration. The method includes the following processing operations.

Operation 301: a session management function (SMF) receives current location information of a terminal. The SMF is located at a core data management center, and a first service and a service message are added in the SMF. The first service is configured to manage a business application for context, and the service message is configured to configure a communication link of the business application using the first service.

In the 5G core network, the SMF is responsible for session management, and includes main functions: session management, session establishment, modification and release, such as tunnel maintenance between a UPF and an AN node, UE IP address allocation and management, selection and control of UPFs, configuration of UPF flow redirection and routing of flow to a correct destination, etc.

Since the business application that provides a business service to the terminal is generally deployed in an edge data management center, and the SMF responsible for managing sessions of the terminal is located at the core data management center, so that the business application deployed in the edge data management center and the SMF located at the core data management center do not have a direct interface in the prior art, and thus the business application located at the edge data management center cannot directly subscribe to services published by the SMF.

In some embodiments of the present application, the first service is added in the SMF in order to enable the business application located at the edge data management center to directly subscribe to the services published by the SMF, and the first service is configured to manage the business application for context.

The first service includes the following several main services: a context storage subservice, a context request subservice and a context restoration subservice. The context storage subservice is configured to enable the business application to store a context of a specified business service and return the context to the SMF. The context request subservice is configured to provide a service for returning the context to the business application. The context restoration subservice is configured to restore the context of the specified business service to the business application.

It should be understood that the first service is not only limited to the above three subservices. In some embodiments, other subservices according to a requirement after learning about the above-mentioned idea of the present application, or modify the above subservices, and these additions and modifications shall all fall within the protection of the present application.

After the first service is added in the SMF, a communication link also needs to be established between the SMF and the business application to enable the SMF and the business application to communicate messages.

In some embodiments, the service message may be further added in the SMF, and is configured to configure the communication link of the business application using the first service. The first service message mainly includes the following several messages: a first subservice message, a second subservice message and a third subservice message. The first subservice message is a message configured to inform the business application to store the context of the specified business service. The second subservice message is a message configured to inform the SMF to receive the context of the specified business service. The third subservice message is a message configured to inform the business application to restore the context of the specified business service.

It should be understood that the service message is not only limited to the above three subservice messages. Other subservice messages according to a requirement after learning about the above-mentioned idea of the present application, or modify the above subservice messages, and these additions and modifications shall all fall within the protection of the present application.

In order to enable the business application of the edge data center to receive the above-mentioned service message and make a response according to information carried in the service message, a response mechanism (which may also be considered as a part of content of the service message) corresponding to each subservice message in the above-mentioned service messages also needs to be specified in the UPF deployed in the edge data center, so that the UPF may transmit the above-mentioned message to the business application that is located at the same edge data center and has subscribed to the first service. The business application located at the edge data center may also subscribed to the first service from the SMF through a local UPF.

A service management function is added in the UPF located at the edge data center in order to cooperate with the first service and process various items generated by the subscription of the local business application to the first service. The service management function mainly includes: a service registration subfunction, a service subscription subfunction, a service notification subfunction and a service request subfunction.

The above various subfunctions are described in detail below.

The service registration subfunction is configured to process an SMF service registration request received by the UPF, and store parameters such as an identifier of the SMF and a published service list locally.

The service subscription subfunction is configured to process a service subscription message of the business application, and store subscription related parameters locally, such as an identifier of the business application, the name of a subscribed service and a uniform resource locator (URL) of the service notification.

The service notification subfunction is configured to process the service message of the SMF received by the UPF, and transmits the service message to the business application that subscribes to the first service according to a session ID carried in the service message, a packet filter configured during establishment of a session of a protocol data device (PDU) and subscription information of the business application.

The service request subfunction is configured to process a service request of the business application, then packages the service request in an interface between the SMF and the UPF, and transmits the service request (i.e., a response message of the service message) to the corresponding SMF. The service request generally includes the session ID, the name of a requested service, related parameters and the like.

It should be understood that the service management function is not only limited to the above four subfunctions. With the development of the technology, can add other subfunctions according to a requirement after learning about the above-mentioned idea of the present application, or modify the above subservices, and these additions and modifications shall all fall within the protection of the present application.

The service management function is set in the UPF, so that the services published by the SMF can be registered in the UPF, and the business application can subscribe to the corresponding services according to a requirement. Furthermore, after the services are subscribed, the SMF can inform the corresponding business application of changes of the terminal, so that the business application executes corresponding operations.

In view of above, in some embodiments of the present application, the first service and the service message are added in the SMF, so that the service message becomes an added service management interface between the SMF of the core data center and the UPF of the edge data center; and the service management function is added in the UPF, so that the SMF can publish the first service to the business application through the UPF, and the business application can also subscribe to the first service through the UPF. Therefore, in the moving process of the terminal, the SMF can freely switch the business application for the terminal through the above-mentioned first service and service message and the service management function of the UPF.

The terminal would regularly submit location messages to the core network in the moving process. For example, the terminal submits the location messages to the core network through a base station, so that the SMF can acquire various pieces of information of the terminal through the AMF, and then acquire the current location information of the terminal.

After the current location information of the terminal is acquired, the operation 302 may be executed.

Operation 302: the SMF determines whether it is necessary to switch a path of a business service currently in use for the terminal on the basis of the current location information and original location information of the terminal, and obtains a determination result.

After acquiring the current location information of the terminal, the SMF needs to determine whether the edge data center at which the terminal is located changes according to the current location information. If the edge data center changes, it is necessary to switch the path of the business service currently in use for the terminal in time, so that the terminal can continuously use the business service.

Whether it is necessary to switch the path of the business service currently in use for the terminal may be determined as follows: the SMF determines whether the current location information of the terminal is the same as the original location information of the terminal; and the SMF determines that the path of the business service currently in use needs to be switched for the terminal when the current location information is different from the original location information.

If the SMF finds that the terminal moves from an original edge data center to a target edge data center according to the change of the location information, the SMF can determine that the path of the business service currently in use needs to be switched for the terminal. After it is determined that the path of the business service currently in use needs to be switched for the terminal, the operation 303 can be executed.

Operation 303: the SMF migrates path information of the business service from an original business application of the original edge data center to a target business application of the target edge data center when the determination result is yes. The original business application corresponds to the original location information, and the target business application corresponds to the current location information; and the original business application and the target business application are both for providing the business service to the terminal, and both have subscribed to the first service.

Before the SMF migrates the path information of the business service from the original business application of the original edge data center to the target business application of the target edge data center, the SMF needs to register the first service in the original UPF and the target UPF. Furthermore, the SMF accepts the subscription of the original business application to the first service through the original UPF, and accepts the subscription of the target application to the first service through the target UPF.

After completing initialization, the SMF needs to transmit the service registration message of the first service to the service registration subfunction of the UPF through the SMF service registration request of the service message. During operation, if a UPF is newly added in the edge data center, the SMF also needs to transmit the service registration message to the newly added UPF. In this way, it can be guaranteed that the business application in each edge data center can subscribe to the first service provided by the SMF. Through this mode, the SMF can provide the first service published by it to the local business application through the UPF in each edge data center, so that the local business application can subscribe to the first service.

After determining that the path of the business service currently in use needs to be switched for the terminal, the SMF transmits the non-access stratum (NAS) message to the terminal through the AMF, so that the communication link between the terminal and the original business application is cut off, that is, the session with the original business application is ended. The NAS message includes an ID of a PDU session needing to be re-located by the terminal, and instructs that the PDU session needs to be re-established to the same DN. The terminal ends the session with the original business application. That is, the terminal executes a PDU session release process with the original business application.

After ending the session with the original business application, the terminal can start to establish a session with the target business application.

Figure 4:
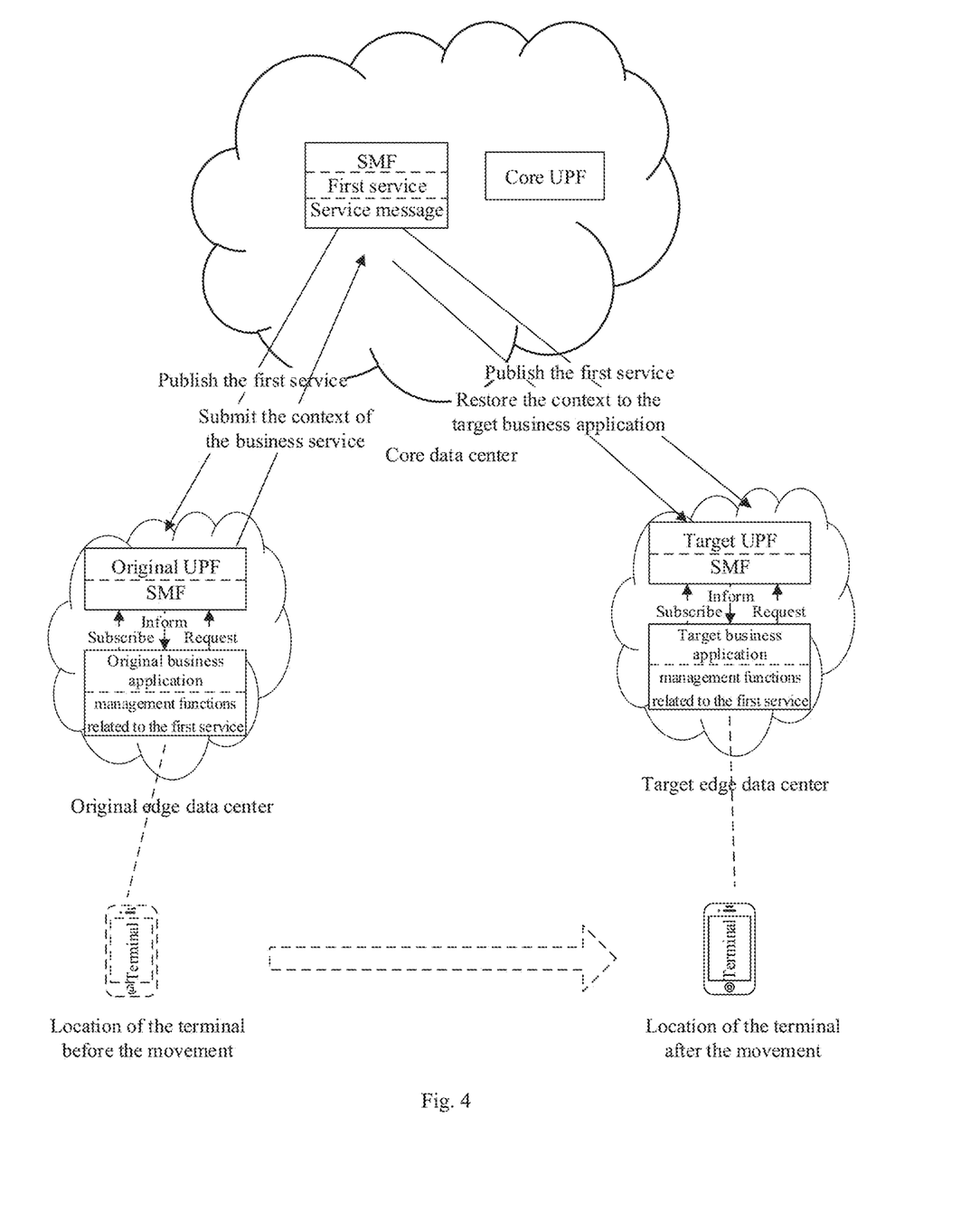
FIG. 4 is a schematic migration diagram of migrating a business service of the terminal from the original data center to the target data center, provided by an embodiment of the present application.

Referring to FIG. 4, in some embodiments, to implement that the SMF migrates the path information of the business service from the original business application of the original edge data center to the target business application of the target edge data center, the following operations need to be executed.

Firstly, the SMF transmits a context storage notification to the original business application through a first subservice message, and receives a context, which is returned by the original business application based on the context storage notification, of the business service. The first subservice message is a message, configured to inform the business application to store a context of a specified business service, in the service message.

The SMF transmits the context storage notification to the original business application through the first subservice message. For example, the SMF generates the context storage notification through the context storage subservice, and then transmits the context storage notification to the original UPF through the first subservice message to enable the original UPF to transmit the context storage notification to the original business application. The context storage subservice is a subservice in the first service, and is configured to enable the business application to store the context of the specified business application and return the context to the SMF.

Later, the context, which is returned by the original business application based on the context storage notification, of the business service can be received. For example, the SMF acquires the context of the business service from the original UPF of the original business application through a context request subservice. The context request subservice is a subservice in the first service, and is configured to provide a service to the business application for returning the context. The context request subservice returns the context to the SMF through a second subservice message, and the second subservice message is a message, configured to inform the SMF to receive the context of the specified business service, in the service message.

Then, the SMF restores the context of the business service to the target business application through a context restoration subservice to migrate the path information of the business service from the original business application to the target business application. The context restoration subservice is a subservice in the first service, and is configured to restore the context of the specified business service to the business application. The context subservice restores the context to the business application through a third subservice message, and the third subservice message is a message, configured to inform the business application to restore the context of the specified business service, in the service message.

Due to the mode, when the original business application receives the context storage notification, the context of the business service is transmitted to the same business application corresponding to the target UPF through a context migration request service and a context restoration notification service of the SMF, realizing restoration of the operating state of the business on the target side. Then, the SMF switches the path of the business application supporting the business service according to the 3GPP protocol process. After the business service is accessed into a new business application, since the new business application has restored the context of the business service, the continuity of use of the business service by the terminal can be guaranteed.

Figure 5:
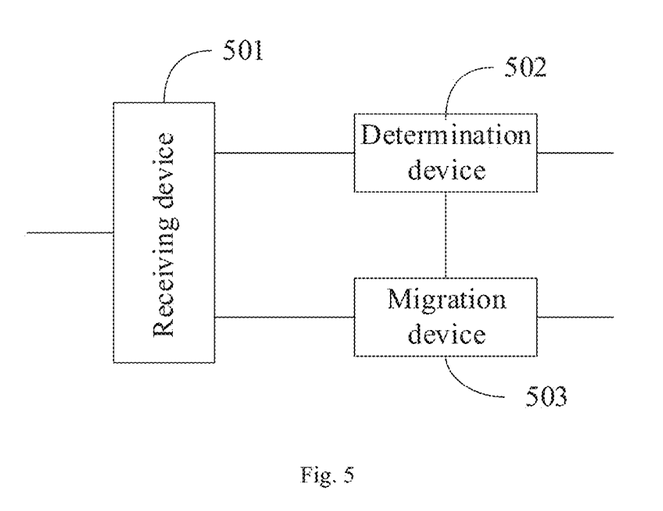
FIG. 5 is a structural schematic diagram of business migration provided by an embodiment of the present application.

Based on the same inventive concept, embodiments of the present application provide an apparatus for business migration. The apparatus is applied to an SMF. A specific implementation mode of a business migration method of the apparatus may be described with reference to the method embodiment portion, and repeated contents are not described. Referring to FIG. 5, the apparatus includes a receiving device 501, a determination device 502, and a migration device 503.

The receiving device 501 is configured to receive current location information of a terminal. The SMF is located at a core data management center, a first service and a service message are added in the SMF, the first service is configured to manage a business application for context, and the service message is configured to configure a communication link of the business application using the first service;

The determination device 502 is configured to determine whether it is necessary to switch a path of a business service currently in use for the terminal on the basis of the current location information and original location information of the terminal, and obtain a determination result;

The migration device 503 is configured to migrate path information of the business service from an original business application of an original edge data center to a target business application of a target edge data center when the determination result is yes. The original business application corresponds to the original location information, and the target business application corresponds to the current location information; and the original business application and the target business application are both for providing the business service to the terminal, and both have subscribed to the first service.

In one embodiment, the determination device 502 configured to determine whether it is necessary to switch the path of the business service currently in use for the terminal is configured to:

determine whether the current location information is the same as the original location information; and determine that the path of the business service currently in use needs to be switched for the terminal when the current location information is different from the original location information.

In one embodiment, the migration device 503 configured to migrate the path information of the business service from the original business application of the original edge data center to the target business application of the target edge data center is configured to:

transmit a context storage notification to the original business application through a first subservice message, and receive a context, which is returned by the original business application based on the context storage notification, of the business service, and the first subservice message is a message, configured to inform a business application to store a context of a specified business service, in the service message; and restore the context of the business service to the target business application through a context restoration subservice to migrate the path information of the business service from the original business application to the target business application, and the context restoration subservice is a subservice in the first service, and is configured to restore a context of a specified business service to a business application; and the context restoration subservice restores the context to the business application through a third subservice message, and the third subservice message is a message, configured to inform the business application to restore the context of the specified business service, in the service message.

In one embodiment, the migration device 503 configured to transmit the context storage notification to the original business application through the first subservice message is configured to:

generate the context storage notification through a context storage subservice, and the context storage subservice is a subservice in the first service, and is configured to enable a business application to store a context of a specified business application and return the context to the SMF; and transmit the context storage notification to an original UPF through the first subservice message to enable the original UPF to transmit the context storage notification to the original business application.

In one embodiment, the migration device 503 configured to receive the context, which is returned by the original business application based on the context storage notification, of the business service is configured to:

acquire the context of the business service from an original UPF of the original business application through a context request subservice, and the context request subservice is a subservice in the first service, and is configured to provide a service to the business application for returning a context; and the context request subservice returns the context to the SMF through a second subservice message, and the second subservice message is a message, configured to inform the SMF to receive a context of a specified business service, in the service message.

In one embodiment, before migrating the path information of the business service from the original business application of the original edge data center to the target business application of the target edge data center, the migration device 503 is also configured to:

register the first service in an original UPF and a target UPF; and accept subscription of the original business application to the first service through the original UPF, and accept subscription of the target application to the first service through the target UPF by the SMF.

In addition, embodiments of the present application further provide an SMF, including: at least one memory and at least one processor. The memory stores a computer program. The computer program is executed by the processor to implement the above-mentioned method for business migration. A specific implementation mode of a business migration method of the SMF may be described with reference to the method embodiment portion, and repeated contents are not described.

Embodiments of the present application further provide a non-volatile computer readable storage medium storing a computer program. The computer program is executed by a processor to implement the above-mentioned method for business migration.

In the embodiments provided by the present application, the first service and the service management message are added in the SMF to enable the first service of the SMF to be subscribed by the business application, so that the SMF can migrate the business service being used by the terminal from the original business application of the original edge data center to the target business application of the target edge data center in the moving process of the terminal, restoring the operating state of the business service on the target business application side, and then the SMF can switch a business path according to the standard 3GPP protocol process. After the business service is accessed into the target business application, since the context of the business service has been restored in the target business application, the continuity of use of the business service by the terminal can be ensured.

Further, by the use of the above embodiments, the path of the business service is changed under the control of the SMF, the SMF transmits the context storage notification to the business application before the path of the business service is changed, and then the original business application is enabled to transmit the context of the business service to the target business application corresponding to the target UPF of the target data center through the context request subservice, avoiding a demand for direct communication between the original business application and the target business application and a demand for deploying a shared database. Instead, the original business application and the target business application can easily and conveniently complete the migration of the business service of the terminal by subscribing to the first service.

Further, in a 5G network, the UPF can be deployed flexibly. For example, it may be deployed in a core data center, an aggregation data center, an edge data center or a wireless access cloud. The current 3GPP network architecture does not support the business application that is deployed in the same infrastructure as the UPF to subscribe to services published by network functions of the core network, so that through the adoption of the embodiments provided by the present application, service management related interfaces (i.e., service management messages) are added between the SMF and the UPF, and a service management function is added to the UPF; and thus, the 5G core network and other network elements can take the UPF as a proxy and then publish network services (i.e., the first service) through the UPF to enable the business application deployed in the edge data center to subscribe to the services published by network functions of the core network.

The embodiments of the present application may be methods, systems or computer program products. Therefore, the embodiments of the present application may adopt the form of a complete hardware embodiment, a complete software embodiment, or a software and hardware combination embodiment. In addition, the embodiments of the present application may adopt the form of a computer program product implemented on one or multiple computer-sensitive storage media (including, but not limited to, a magnetic disk memory, a Compact Disc Read-Only Memory (CD-ROM), an optical memory and the like) including computer-sensitive program codes.

The embodiments of the present application are described by referring to flow diagrams and/or block diagrams of methods, devices (systems) and computer program products according to the embodiments of the present application. It should be understood that computer program instructions can implement each flow and/or each block in the flow diagrams and/or the block diagrams and combination of the flows and/or the blocks in the flow diagrams and/or the block diagrams. These computer program instructions can be provided for a general computer, a dedicated computer, an embedded processor or processing devices of other programmable data processing devices to generate a machine, making the instructions that are executed by the computer or the processing devices of other programmable data processing devices generate apparatuses for realizing specified functions in one or multiple flows of the flow diagrams and/or one or multiple blocks of the block diagrams.

These computer program instructions may also be stored in a computer readable memory for guiding the computer or other programmable data processing devices to work in a specific manner, making the instructions that are stored in the computer readable memory generate manufactured products that include instruction apparatuses. The instruction apparatuses realize the specified functions in one or multiple flows of the flow diagrams and/or one or multiple blocks of the block diagrams.

These computer program commands may also be loaded onto the computer or other programmable data processing devices to execute a series of operation steps on the computer or other programmable data processing devices to generate computer implemented processing, so that the instructions executed on the computer or other programmable data processing devices provide steps for realizing the specified functions in one or multiple flows of the flow diagrams and/or one or multiple blocks of the block diagrams.

What is claimed is:

1. A method for data migration, comprising:
receiving, by a Session Management Function (SMF), current location information of a terminal, wherein the SMF is located at a core data management center, a first service and a service message are added in the SMF, the first service is configured to manage a business application for context, and the service message is configured to configure a communication link of the business application using the first service;
determining, by the SMF, whether it is necessary to switch a path of a business service currently in use for the terminal on the basis of the current location information and original location information of the terminal; and
when it is determined that it is necessary to switch the path of the business service currently in use for the terminal, migrating, by the SMF, path information of the business service from an original business application of an original edge data center to a target business application of a target edge data center, wherein the original business application corresponds to the original location information, and the target business application corresponds to the current location information; and the original business application and the target business application are both for providing the business service to the terminal, and both have subscribed to the first service.

2. The method according to claim 1, wherein said determining whether it is necessary to switch the path of the business service currently in use for the terminal comprises:
  determining whether the current location information is same as the original location information; and
  determining, by the SMF, that the path of the business service currently in use needs to be switched for the terminal when the current location information is different from the original location information.

3. The method according to claim 1, wherein said migrating, by the SMF, the path information of the business service from the original business application of the original edge data center to the target business application of the target edge data center comprises:
  transmitting, by the SMF, a context storage notification to the original business application through a first subservice message, and receiving a context, which is returned by the original business application based on the context storage notification, of the business service, wherein the first subservice message is a message, configured to inform a business application to store a context of a specified business service, in the service message; and
  restoring, by the SMF, the context of the business service to the target business application through a context restoration subservice to migrate the path information of the business service from the original business application to the target business application, wherein the context restoration subservice is a subservice in the first service, and is configured to restore a context of a specified business service to a business application; and the context restoration subservice restores the context to the business application through a third subservice message, and the third subservice message is a message, configured to inform the business application to restore the context of the specified business service, in the service message.

4. The method according to claim 3, wherein said transmitting, by the SMF, the context storage notification to the original business application through the first subservice message comprises:
  generating, by the SMF, the context storage notification through a context storage subservice, wherein the context storage subservice is a subservice in the first service, and is configured to enable a business application to store a context of a specified business application and return the context to the SMF; and
  transmitting, by the SMF, the context storage notification to an original User Plane Function (UPF) through the first subservice message to enable the original UPF to transmit the context storage notification to the original business application.

5. The method according to claim 3, wherein said receiving the context, which is returned by the original business application based on the context storage notification, of the business service comprises:
  acquiring, by the SMF, the context of the business service from an original UPF of the original business application through a context request subservice, wherein the context request subservice is a subservice in the first service, and is configured to provide a service to a business application for returning a context; and the context request subservice returns the context to the SMF through a second subservice message, and the second subservice message is a message, configured to inform the SMF to receive a context of a specified business service, in the service message.

6. The method according to claim 1, wherein before said migrating, by the SMF, the path information of the business service from the original business application of the original edge data center to the target business application of the target edge data center, the method further comprises:
  registering, by the SMF, the first service in an original UPF and a target UPF; and
  accepting, by the SMF, subscription of the original business application to the first service through the original UPF, and accepting, by the SMF, subscription of the target application to the first service through the target UPF.

7. A Session Management Function (SMF), comprising at least one memory and at least one processor, wherein the at least one memory stores a computer program executed by the at least one processor to implement:
  receiving, by a Session Management Function (SMF), current location information of a terminal, wherein the SMF is located at a core data management center, a first service and a service message are added in the SMF, the first service is configured to manage a business application for context, and the service message is configured to configure a communication link of the business application using the first service;
  determining, by the SMF, whether it is necessary to switch a path of a business service currently in use for the terminal on the basis of the current location information and original location information of the terminal; and
  when it is determined that it is necessary to switch the path of the business service currently in use for the terminal, migrating, by the SMF, path information of the business service from an original business application of an original edge data center to a target business application of a target edge data center, wherein the original business application corresponds to the original location information, and the target business application corresponds to the current location information; and the original business application and the target business application are both for providing the business service to the terminal, and both have subscribed to the first service.

8. The SMF according to claim 7, wherein said determining whether it is necessary to switch the path of the business service currently in use for the terminal comprises:
  determining whether the current location information is same as the original location information; and
  determining, by the SMF, that the path of the business service currently in use needs to be switched for the terminal when the current location information is different from the original location information.

9. The SMF according to claim 7, wherein said migrating, by the SMF, the path information of the business service from the original business application of the original edge data center to the target business application of the target edge data center comprises:
  transmitting, by the SMF, a context storage notification to the original business application through a first subservice message, and receiving a context, which is returned by the original business application based on the context storage notification, of the business service, wherein the first subservice message is a message, configured to inform a business application to store a context of a specified business service, in the service message; and
  restoring, by the SMF, the context of the business service to the target business application through a context restoration subservice to migrate the path information of the business service from the original business application to the target business application, wherein the context restoration subservice is a subservice in the first service, and is configured to restore a context of a specified business service to a business application; and the context restoration subservice restores the context to the business application through a third subservice message, and the third subservice message is a message, configured to inform the business application to restore the context of the specified business service, in the service message.

10. The SMF according to claim 9, wherein said transmitting, by the SMF, the context storage notification to the original business application through the first subservice message comprises:
generating, by the SMF, the context storage notification through a context storage subservice, wherein the context storage subservice is a subservice in the first service, and is configured to enable a business application to store a context of a specified business application and return the context to the SMF; and
transmitting, by the SMF, the context storage notification to an original User Plane Function (UPF) through the first subservice message to enable the original UPF to transmit the context storage notification to the original business application.

11. The SMF according to claim 9, wherein said receiving the context, which is returned by the original business application based on the context storage notification, of the business service comprises:
acquiring, by the SMF, the context of the business service from an original UPF of the original business application through a context request subservice, wherein the context request subservice is a subservice in the first service, and is configured to provide a service to a business application for returning a context; and the context request subservice returns the context to the SMF through a second subservice message, and the second subservice message is a message, configured to inform the SMF to receive a context of a specified business service, in the service message.

12. The SMF according to claim 7, wherein before said migrating, by the SMF, the path information of the business service from the original business application of the original edge data center to the target business application of the target edge data center, the at least one processor is further configured to execute the computer program to implement:
registering, by the SMF, the first service in an original UPF and a target UPF; and
accepting, by the SMF, subscription of the original business application to the first service through the original UPF, and accepting, by the SMF, subscription of the target application to the first service through the target UPF.

13. A non-transitory computer readable storage medium, storing a computer program, wherein the computer program is executed by a processor to implement:
receiving, by a Session Management Function (SMF), current location information of a terminal, wherein the SMF is located at a core data management center, a first service and a service message are added in the SMF, the first service is configured to manage a business application for context, and the service message is configured to configure a communication link of the business application using the first service;
determining, by the SMF, whether it is necessary to switch a path of a business service currently in use for the terminal on the basis of the current location information and original location information of the terminal; and
when it is determined that it is necessary to switch the path of the business service currently in use for the terminal, migrating, by the SMF, path information of the business service from an original business application of an original edge data center to a target business application of a target edge data center, wherein the original business application corresponds to the original location information, and the target business application corresponds to the current location information; and the original business application and the target business application are both for providing the business service to the terminal, and both have subscribed to the first service.

14. The non-transitory computer readable storage medium according to claim 13, wherein said determining whether it is necessary to switch the path of the business service currently in use for the terminal comprises:
determining whether the current location information is same as the original location information; and
determining, by the SMF, that the path of the business service currently in use needs to be switched for the terminal when the current location information is different from the original location information.

15. The non-transitory computer readable storage medium according to claim 13, wherein said migrating, by the SMF, the path information of the business service from the original business application of the original edge data center to the target business application of the target edge data center comprises:
transmitting, by the SMF, a context storage notification to the original business application through a first subservice message, and receiving a context, which is returned by the original business application based on the context storage notification, of the business service, wherein the first subservice message is a message, configured to inform a business application to store a context of a specified business service, in the service message; and
restoring, by the SMF, the context of the business service to the target business application through a context restoration subservice to migrate the path information of the business service from the original business application to the target business application, wherein the context restoration subservice is a subservice in the first service, and is configured to restore a context of a specified business service to a business application; and the context restoration subservice restores the context to the business application through a third subservice message, and the third subservice message is a message, configured to inform the business application to restore the context of the specified business service, in the service message.

16. The non-transitory volatile computer readable storage medium according to claim 15, wherein said transmitting, by the SMF, the context storage notification to the original business application through the first subservice message comprises:
generating, by the SMF, the context storage notification through a context storage subservice, wherein the context storage subservice is a subservice in the first service, and is configured to enable a business application to store a context of a specified business application and return the context to the SMF; and
transmitting, by the SMF, the context storage notification to an original User Plane Function (UPF) through the first subservice message to enable the original UPF to transmit the context storage notification to the original business application.

17. The non-transitory computer readable storage medium according to claim 15, wherein said receiving the context, which is returned by the original business application based on the context storage notification, of the business service comprises:

acquiring, by the SMF, the context of the business service from an original UPF of the original business application through a context request subservice, wherein the context request subservice is a subservice in the first service, and is configured to provide a service to a business application for returning a context; and the context request subservice returns the context to the SMF through a second subservice message, and the second subservice message is a message, configured to inform the SMF to receive a context of a specified business service, in the service message.

18. The non-transitory computer readable storage medium according to claim 13, wherein before said migrating, by the SMF, the path information of the business service from the original business application of the original edge data center to the target business application of the target edge data center, the at least one processor is further configured to execute the computer program to implement:

registering, by the SMF, the first service in an original UPF and a target UPF; and accepting, by the SMF, subscription of the original business application to the first service through the original UPF, and accepting, by the SMF, subscription of the target application to the first service through the target UPF.

* * * * *